Patented Dec. 7, 1937

2,101,547

UNITED STATES PATENT OFFICE 2,101,547

PROCESS OF CURING HAMS

John C. Kistler, Chicago, Ill., assignor to Armour and Company, Chicago, Ill., a corporation of Illinois No Drawing. Application March 15, 1937, Serial No. 131,110

4 Claims. (Cl. 99—159)

This invention relates to processes of curing pork hams, shoulders, beef hams and similar materials, and it comprises processes wherein such products are first subjected to curing with ordinary salt-curing compounds but only for about half the usual time, the products then heated in hot water, and the thus treated products finally smoked in the usual way.

Hams are customarily cured prior to smoking by treating them with curing compounds containing nitrates, or mixtures of nitrates and nitrites. A dry-curing composition may, for example, have about the following composition:

|  | Percent |
|---|---|
| Salt | 50–95 |
| Sugar | 1–40 |
| Sodium nitrate | 0–10 |
| Sodium nitrite | 0– 1 |

This mixture is rubbed on the surface of the fresh hams and the hams held in contact with this mixture for a rather long period of time, usually more than a month. Thereafter, the hams are smoked in the usual way.

Hams are also cured by immersing them in brine solutions each 100 gallons of which may contain the following:

|  | Pounds |
|---|---|
| Salt | 260 to 100 |
| Sugar | 50 to 10 |
| Nitrate | 4 to 0.0 |
| Nitrite | 2 to 0.0 |

In either case, the hams may or may not be pumped previously with brine of compositions similar to the above.

During the curing, the carbohydrates in the meat tissue and those added in the curing composition are largely fermented to lactic acid. Lactic acid is one of the major factors in curing meat. It causes a partial coagulation of the proteins, destroying their colloidal structure, and thus permits dehydration or drying out of the ham to occur at smoke-house temperatures.

Present methods of fully curing with the ordinary curing compounds are quite drastic. The final product, while edible, is not as tender as the art would like. This is because the partial coagulation of the proteins by lactic acid proceeds to such an extent that a "tough" meat product results. In other words, the desirable changes during curing, such as development of flavor and color, are accompanied by undesirable changes in the tenderness of the ham due to the formation of greater amounts of lactic acid over the long curing period necessary. As stated, the normal protein gel structure of the ham must be modified before smoking. This fermentation to lactic acid will give a product which can be dried but at the same time the large amounts of lactic acid toughen the ham.

The art has long desired a method by which hams could be cured for flavor and color development but yet have the hams retain qualities of tenderness. Under-curing alone is unsatisfactory because under-cured hams exude brine when cut.

By the process of the present invention I am able to develop the desired color and flavor in the ham, but at the same time I am able to make a ham which is much more tender than hams cured in the ordinary way. My process consists in curing the ham in two separate steps one of which is entirely similar to the ordinary brine or dry-curing method, but is conducted for only about half the usual time required to effect complete curing by this method. In my second step I heat the ham in water at a carefully regulated temperature until the internal temperature in the center of the ham reaches about 48° C. to about 55° C. The actual temperature of the water in which the ham is immersed during this heating period is from about 65° C. to 75° C., and the time of immersion varies from about four to six hours depending upon the size of the ham.

The water in which I immerse the ham is free of any added curing agents, although it may contain very small amounts of salts extracted from the salt-treated hams.

Under the conditions of my process the ham is only partially cured in the first step. By using the ordinary brine solutions or dry-curing compositions, I develop the desirable flavor and color in the ham which is associated with an ordinary salt-cured product. But by limiting the extent of salt-curing I avoid toughening of the meat hitherto accepted as a necessary evil in present curing methods. During the second step in my process the biological action leading to the formation of further quantities of lactic acid is stopped and the cure completed by the heating, but in the absence of these additional amounts of fermentation products which would ordinarily be formed. Such heating is in no sense an actual cooking of the ham in the accepted sense of the word because the ham is not then ready for eating. The temperatures which I use in the heating step are too low for complete coagulation of the proteins to occur, and in all cases the heating temperature is below that of the melting point of substantial amounts of the fats and greases in the ham.

The first step in my process can be looked upon as one for developing flavor and color, together with some slight coagulation of proteins. The second step continues the coagulation but in the absence of further quantities of lactic acid which normally develop in ordinary curing. Consequently, I avoid toughening the ham by excess quantities of lactic acid. In a ham cured in the ordinary way the amount of lactic acid is about 0.5%. In my method the amount is about 0.15% calculated on a dry basis. In addition, I greatly decrease the time for fully curing hams since my first step is only about half the usual curing time and my second step only a few hours.

Thus, for example, in the practise of my invention I immerse the hams in a curing brine, such as that given above, for about ten days. This is roughly half the time which I would use if I were going to completely cure the hams in the brine solution. The hams are then transferred to a large vat containing water heated at a temperature of about 60° to 75° C. The hams are maintained in the warm water for about four and one-half hours until an internal temperature in the center of the ham of about 48° to 55° C. is reached. Then the hams are withdrawn and smoked in the usual way.

The color of the ham after smoking is bright and evenly distributed, the flavor is particularly palatable and free from an excess of salt. The keeping qualities of the ham are superior since the ham has been in effect pasteurized. Unlike the usual under-cured ham, the meat exudes no brine upon being cut. The eating characteristics of the ham are very much better than those of hams cured in the ordinary way since I have limited the quantities of the lactic acid so that the meat is not toughened by large quantities thereof.

When hams are cured by dry-curing methods, I treat the ham with the dry-curing salt, allow it to remain in the mixture for about fourteen to sixteen days, or roughly one-half the usual time, and then immerse the ham in the bath of hot water for the time stated.

I claim no novelty in the use of any particular salt-curing composition since I can use any of those customarily employed at the present time. Most all of these are mixtures of nitrates and nitrites, together with sugar and sodium chloride. Consequently, in the appended claims I define the curing composition merely as a salt-curing composition. The scope of this will be evident to those skilled in the art.

It is difficult for me to set forth any precise length of time for the first curing step in my process. This is because packing-house practise with ordinary salt-curing methods may be occasionally varied with respect to time depending upon the kind of curing compound, the size of the hams, the temperature of the curing cellars and like considerations. Although best results are obtained when the salt-cure is for about half the time which would be required to effect a complete cure by salt, this time is subject to some variation. Thus, I can salt-cure the ham for about two-thirds the time for a normal cure and then heat in hot water. The longer the ham remains in contact with the curing composition the more lactic acid will be developed and consequently, the meat will be less tender. I prefer to use the salt-cure only as long as is required for the development of flavor and color, and then heat the hams in the hot water. Variation in the length of times will, therefore, depend upon the characteristics desired in the final meat.

My process is applicable to the curing of the usual pork ham and shoulders, pork butts, and cured beef hams. All of these products can be generically defined as "hams".

Having thus described my invention, what I claim is:

1. The process of curing hams which comprises the steps of first partially curing the hams with a salt-curing composition, then immersing the hams in hot water maintained at a temperature of about 60° to 75° C. for a period of time of about four to six hours, and then smoking the hams in the usual way.

2. The process of curing hams which comprises the steps of first curing the hams with a salt-curing composition but for about only half the usual length of time, then immersing the partially cured hams in hot water maintained at a temperature of about 60° to 75° C. for a period of time of about four to six hours, and then smoking the ham in the usual way.

3. The process of curing hams which comprises the steps of first partially curing the hams with a salt-curing composition, then immersing the hams in hot water for about four to six hours until the internal temperature in the center of the ham reaches about 48° to 55° C., and then smoking the ham in the usual way.

4. The process of curing hams which comprises the steps of first curing the hams with a salt-curing composition but for about only half the usual length of time, then immersing the hams in hot water for about four to six hours until the internal temperature in the center of the ham reaches about 48° to 55° C., and then smoking the ham in the usual way.

JOHN C. KISTLER.